US010520633B2

(12) United States Patent
Itskovich (10) Patent No.: US 10,520,633 B2
(45) Date of Patent: Dec. 31, 2019

(54) DUAL-TRANSMITTER WITH SHORT SHIELDS FOR TRANSIENT MWD RESISTIVITY MEASUREMENTS

(71) Applicant: BAKER HUGHES INCORPORATED, Houston, TX (US)

(72) Inventor: Gregory B. Itskovich, Houston, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 446 days.

(21) Appl. No.: 14/965,517

(22) Filed: Dec. 10, 2015

(65) Prior Publication Data

US 2017/0168190 A1 Jun. 15, 2017

(51) Int. Cl.
*G01V 3/28* (2006.01)
(52) U.S. Cl.
CPC ..................................... *G01V 3/28* (2013.01)
(58) Field of Classification Search
CPC ....................................................... G01V 3/18
See application file for complete search history.

(56) References Cited

U.S. PATENT DOCUMENTS

| 4,845,433 A | 7/1989 | Kleinberg et al. |
| 5,038,107 A | 8/1991 | Gianzero et al. |
| 5,138,263 A | 8/1992 | Towle |
| 5,883,515 A * | 3/1999 | Strack ............. G01V 3/20 324/339 |
| 5,939,885 A | 8/1999 | McClure et al. |
| 6,100,696 A | 8/2000 | Sinclair |
| 6,571,129 B2 | 5/2003 | Schaldach |
| 6,766,854 B2 | 7/2004 | Ciglenec et al. |
| 7,027,922 B2 | 4/2006 | Bespalov et al. |
| 7,046,009 B2 | 5/2006 | Itskovich |

(Continued)

FOREIGN PATENT DOCUMENTS

WO 2015073484 A1 5/2015

OTHER PUBLICATIONS

Int'l Search Report & Written Opinion in PCT/US2016/065602, dated Mar. 27, 2017.

*Primary Examiner* — Mohamed Charioui
(74) *Attorney, Agent, or Firm* — Mossman, Kumar & Tyler PC (57) ABSTRACT

Systems, devices, and methods for evaluating an earth formation. Method embodiments may include conveying a carrier in a borehole, the carrier including a conducting tubular having a plurality of transmitters and a receiver non-collocated with the plurality of transmitters; inducing a first current in the earth formation using a first transmitter of the plurality of transmitters; measuring with the receiver a first time-dependent transient electromagnetic (TEM) signal induced by the formation responsive to the first current; inducing a second current in the earth formation using a second transmitter of the plurality of transmitters; measuring with the receiver a second TEM signal induced by the formation responsive to the second current; and using at least one processor to estimate a value of a resistivity property of the earth formation using a bucked signal derived from the first time-dependent TEM signal, the second time-dependent TEM signal, and a bucking coefficient K(t).

18 Claims, 7 Drawing Sheets

(56) References Cited

U.S. PATENT DOCUMENTS

| | | |
|---|---|---|
| 7,150,316 B2 | 12/2006 | Itskovich |
| 7,167,006 B2 | 1/2007 | Itskovich |
| 7,541,813 B2 | 6/2009 | Synder et al. |
| 7,583,085 B2 | 9/2009 | Hall et al. |
| 7,598,742 B2 | 10/2009 | Synder et al. |
| 7,759,943 B2 | 7/2010 | Homan et al. |
| 8,072,221 B2 | 12/2011 | Snyder, Jr. et al. |
| 8,258,790 B2 | 9/2012 | Folberth et al. |
| 8,794,318 B2 * | 8/2014 | Harrigan ............... E21B 49/008 166/100 |
| 2004/0183538 A1 * | 9/2004 | Hanstein ................. G01V 3/28 324/339 |
| 2005/0093547 A1 * | 5/2005 | Xiao ....................... G01V 3/28 324/339 |
| 2006/0192562 A1 * | 8/2006 | Davydychev ............ G01V 3/28 324/339 |
| 2011/0227578 A1 * | 9/2011 | Hall ........................ G01V 3/28 324/343 |
| 2011/0308794 A1 | 12/2011 | Bittar et al. |
| 2012/0199394 A1 | 8/2012 | Bittar et al. |
| 2014/0121974 A1 | 5/2014 | Itskovich |
| 2014/0253131 A1 | 9/2014 | Liu et al. |
| 2014/0340089 A1 | 11/2014 | Rodney |
| 2015/0096806 A1 | 4/2015 | Fonseca Ocampos et al. |
| 2015/0241592 A1 | 8/2015 | Itskovich et al. |
| 2015/0268371 A1 | 9/2015 | Donderici et al. |

\* cited by examiner

DUAL-TRANSMITTER WITH SHORT SHIELDS FOR TRANSIENT MWD RESISTIVITY MEASUREMENTS

FIELD OF THE DISCLOSURE

In one aspect, the present disclosure generally relates to methods, systems, and devices for electromagnetic well logging. More specifically, aspects of the present disclosure relate to measurements using transient electromagnetic signals.

BACKGROUND OF THE DISCLOSURE

Geologic formations are used for many purposes such as hydrocarbon and water production. Boreholes are typically drilled into the earth in order to intersect and access the formations.

Electromagnetic induction resistivity instruments have been used for some time to determine the electrical conductivity of earth formations surrounding a wellbore. More recently, development of deep looking tools based on transient field behavior, which may capable of formation evaluation at distances ranging from tens to hundreds of meters, has been attempted. In transient electromagnetic (TEM) methods, voltage or current pulses that are excited in a transmitter initiate the propagation of an electromagnetic signal in the earth formation. The transmitter and receiver may be at the surface or within the wellbore. Electric currents diffuse outwards from the proximity of the transmitter into the surrounding formation. At different times, information arrives at the measurement sensor predominantly from different investigation depths. Generally, early-time signals predominantly relate to near-zone responses (lesser depths of investigation) and late-time signals predominantly relate to remote-zone responses (greater depths of investigation).

SUMMARY OF THE DISCLOSURE

Aspects of the present disclosure include systems, methods and devices for evaluating an earth formation intersected by a borehole. Method embodiments may include conveying a carrier in a borehole, the carrier including a conducting tubular having a plurality of transmitters and a receiver non-collocated with the plurality of transmitters; inducing a first current in the earth formation using a first transmitter of the plurality of transmitters; measuring with the receiver a first time-dependent transient electromagnetic (TEM) signal induced by the formation responsive to the first current; inducing a second current in the earth formation using a second transmitter of the plurality of transmitters; measuring with the receiver a second TEM signal induced by the formation responsive to the second current; and using at least one processor to estimate a value of a resistivity property of the earth formation using a bucked signal derived from the first time-dependent TEM signal, the second time-dependent TEM signal, and a bucking coefficient $K(t)$.

The first time-dependent TEM signal and the second time-dependent TEM signal may include parasitic signal contributions from the tubular, and the bucking coefficient $K(t)$ may be configured such that the bucked signal is substantially free of parasitic signal effects from the tubular. Methods may include estimating the bucking coefficient $K(t)$ using signals received at the receiver in response to transmission of a corresponding electromagnetic pulse from each of the first transmitter and the second transmitter while the carrier is outside of the earth formation.

Methods may include estimating the bucking coefficient $K(t)$ by at least one of: i) estimating the bucking coefficient according to $$K(t) = C2(t)/C1(t),$$

wherein C1 is the first time-dependent TEM signal and C2 is the second time-dependent TEM signal; ii) estimating the bucking coefficient according to $$K(t) = \frac{M_1}{M_2} \frac{L_2^3}{L_1^3},$$

wherein $M_1$ is a magnetic moment of the first transmitter, $M_2$ is a magnetic moment of the second transmitter, $L_1^3$ is the distance from the first transmitter to the receiver and $L_2^3$ is the distance from the second transmitter to the receiver; and iii) finding corresponding to $$\left| \sum_{i=1}^{N} \left( C_1(t) - k(t) \frac{M_1}{M_2} \frac{L_2^3}{L_1^3} C_2(t) \right)^2 \right|_{min},$$

wherein $C_1$ is the first time-dependent TEM signal and $C_2$ is the second time-dependent TEM signal, $M_1$ is a magnetic moment of the first transmitter, $M_2$ is a magnetic moment of the second transmitter, $L_1^3$ is the distance from the first transmitter to the receiver and $L_2^3$ is the distance from the second transmitter to the receiver, and N is a number of measurement samples at corresponding discrete times.

Methods may include covering a plurality of surfaces of the tubular with electromagnetic shielding, wherein the plurality of surfaces overlap the first and the second of the plurality of transmitters and the receiver. Methods may include covering a plurality of surfaces of the electromagnetic shielding with magnetostatic shielding. The magnetostatic shielding may comprise a soft magnetic material.

Methods may include deriving the bucked signal, wherein the bucked signal is substantially unaffected by a parasitic signal from the conducting tubular, and using the resistivity property of the earth formation to conduct further operations in the earth formation. The resistivity property of the earth formation may be selected from: (i) a resistivity of the formation, (ii) a conductivity of the formation, and (iii) a dielectric constant of the formation. The carrier may comprise a bottomhole assembly including a drill bit, and the resistivity property of the earth formation may comprise a distance to an interface in the earth formation. Methods may include controlling a direction of drilling of the bottomhole assembly using the estimated value of the distance to the interface. Methods may include estimating the resistivity property for a portion of the earth formation ahead of the drill bit.

The first transmitter may comprise a first antenna coil and the second antenna may include a second antenna coil electrically connected in circuit with the first antenna coil, and the first current may be equal to the second current. The first antenna coil may comprise a first number of turns of a wire and the second antenna coil may comprise a second number of turns of the wire different than the first number of turns. The conductive tubular may comprise at least one reduced conductivity composite material.

The at least one processor may be configured to estimate the resistivity property of the earth formation using first and second transient signals to derive a bucked signal substantially unaffected by the tubular. Alternatively, or additionally, the at least one processor may be further configured to estimate the value of the resistivity property of the earth formation by performing an inversion using a 1-D model without using a representation of the conducting tubular.

Example features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Aspects of the present disclosure relate to apparatuses and methods for electromagnetic induction well logging for evaluating an earth formation. Some aspects relate particularly to estimating properties of the formation relating to transient electromagnetic (TEM) measurements. The formation may be intersected by a wellbore which is formed by a bottom hole assembly ('BHA') of a drill string. The TEM measurements are taken in the wellbore, and may be used to estimate a parameter of interest. More specifically, the present disclosure relates to techniques enabling deep measurement-while-drilling ('MWD') resistivity measurements suitable for geo-steering and measurements ahead of the bit.

Aspects of the present disclosure mitigate parasitic electrical effects of a tubular (e.g., drillpipe, drill collar) in the drillstring through techniques for making and processing signals to provide more accurate estimation of parameters of interest (e.g., physical properties) of the formation. Apparatus embodiments are capable of extracting information about resistivity and other parameters of the formation while using a conductive BHA.

Parameters of the earth formation may be estimated using signals obtained in the borehole via electrical phenomena. The measurement may include characterizing or recording transient signals in the receiver loop when current is switched off in a pair of transmitters (e.g., transmitter coils) placed at some distance from the receiver.

One aspect of measurement-while-drilling (MWD) applications is the estimation of the distance from the drillbit to an interface in the earth formation that has a resistivity contrast across the interface. The interface may be a bed boundary and/or a fluid interface between a non-conducting fluid (e.g., a hydrocarbon) and a conducting fluid (e.g., brine).

The present disclosure is susceptible to embodiments of different forms. There are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Transient electromagnetic (TEM) tools are configured to effect changes in a pair of transmitters to induce a time-dependent current in a formation. Transient signals occur in the receiver antenna, which are induced by the eddy currents in the formation. The induced signal contains information about formation characteristics. Thus, the receiver produces a response indicative of formation characteristics, such as, for example, a resistivity property of the formation. Electronics may be configured to measure the time-dependent transient electromagnetic (TEM) signal induced by the eddy currents in the formation.

In a typical transient induction tool, a magnetic dipole is abruptly reversed at the transmitter loop. For example, current in a transmitter coil drops from its initial value $I_0$ to 0 at the moment t=0. Subsequently, measurements are taken while the rotating tool is moving along the borehole trajectory. The currents induced in the formation and the drillpipe begin diffusing from the region close to the transmitter coil in all the directions surrounding the transmitter. These currents induce electromagnetic field components which can be measured by receivers (e.g., induction coils) placed along the conductive pipe at some distance from the transmitter. U.S. Pat. Nos. 7,167,006; 7,150,316; 7,046,009, which relate to details of TEM measurements, are commonly assigned to the assignee of the present invention and are hereby incorporated by reference herein in their entirety.

It would be desirable to have deep transient measurements (i.e., greater than 30 meters) for geosteering and other purposes. Currently, the main obstacles preventing deep geo-steering beyond 30 meters using transient electromagnetic measurements are caused by the presence of the ubiquitous metal drillpipe; typically, drilling tubular is made of steel. Signal contributions due to the eddy currents in the pipe are parasitic. The signal due to these currents can be much larger (by several orders of magnitude) than the signal from the formation at the time interval where parameters of interest manifest themselves.

The measured transient signal is severely affected by the eddy currents in the pipe that limit resolution of the measurements of the formation parameters, such as, for example, distance to a resistivity boundary. By maximizing the distance between transmitter and receiver it is possible to reduce the influence of the drillpipe signal while increasing the contribution of the signal from the formation. However, such systems result in a limited resolution with respect to the parameters of interest, and the dimensional requirements of such systems (up to 30 meters) may be prohibitive for MWD applications. It would be desirable to mitigate the parasitic signals caused by eddy currents in the drilling tubular in transient field signal detection methods at lesser distances between transmitter and receiver.

In the case of measurements ahead of the bit, positioning of the induction system with respect to the drill bit presents another complication. The first 3-4 meters in the vicinity of the drill bit are not available for transmitter/receiver placement, because equipment supporting the drilling process occupies this space. If it is desirable to look about 5 meters ahead of the bit, the transmitter/receiver system would be separated from the region of interest by 8-9 meters of distance, but none of the existing resistivity tools compatible with MWD are capable of reliable measurement at such depth of investigation.

Aspects of the present disclosure relate to the use of transient electromagnetic (TEM) tools in connection with drilling. The tools may have two operational modes: the first mode may be used to define a bucking coefficient, and the second mode may be used to provide information about properties of the formation using the bucking coefficient. Bucking is defined as a zero signal in the receiving coil providing a zero signal in the absence of the formation, which is enabled by mitigation of the parasitic effects on the signal.

To attenuate parasitic effects of currents in the drill pipe prior to further processing, a dual-transmitter bucking system may be employed having magnetostatic shields (e.g., ferrite) in combination with a highly conductive electromagnetic (e.g., copper) shields adjacent to the coils. The magnetostatic shielding substantially reduces (attenuates) eddy currents in the portion of the conductive tubular covered by the magnetic material. The electromagnetic shielding substantially reduces the contribution of the eddy currents induced in the copper shield relative to the contribution of the eddy currents induced in the formation into the measured signal. This preserves resolution of the transient signal to the remote resistivity boundaries.

Embodiments of the present disclosure also experience a significant increase in the effective transmitter/receiver moment thanks to the application of magnetic material used for shielding. These design features attenuate intensity of the eddy currents in the vicinity of both transmitter and receivers and, as a result, diminish (attenuate) the parasitic effect from the tubular in the signal. In turn, these features provide synergistic effects with the improved bucking process, as described below.

Aspects of the present disclosure mitigate parasitic signal effects using a novel bucking technique. Note that these effects may be previously attenuated using the design features described above, or other techniques known in the art. Bucking techniques using two receiver coils responsive to a single transmitter are known. However, in accordance with embodiments of the present disclosure, further mitigation of the parasitic effect may be achieved by using at least two transmitters for a single receiver and performing bucking to suppress the tubular signal and recover the formation signal.

This configuration, employing dual transmitting coils paired with a single receiving coil, is recommended by several advantages. For example, the dual transmitter-single receiver (2T-1R) technique avoids interaction between two receivers. Also, employing electrostatic shielding on a transmitter side is more effective than on the receiver side. Thus, in the dual transmitter 3-coil system, the issue of cross-talk between main and bucking coils, which is problematic in the dual-receiver arrangement, is substantially eliminated.

In a dual receiver system, the induced voltage in the bucking coil affects readings in the main coil and vice versa and this induced signal that comes from the other coil is parasitic. In practice, it is virtually impossible to separate this parasitic signal from the signal from the formation. In a dual receiver system, the useful signal is constructed by combining signals from two receivers and, normally, this combination cancels out at least the first 2 digits of the original signal. Given that the cross-talk signal affects the third digit of the original signal, this illustrates the significance of the effect of cross talk on the signal—tens of percentages. Reducing crosstalk below the third digit of the original signal is technically challenging in the dual receiver system. However, when a dual transmitter-single receiver (2T-1R) system is employed, the issue is substantially automatically resolved, because the excitation current is directly controlled by the measurement electronics and immune to the crosstalk between transmitting coils. The end result of these features shows a vastly improved bucking signal, and thus, a surprising decrease in parasitic signal attributable to the conductive tubular (e.g., drilling tubular).

Figure 1A:
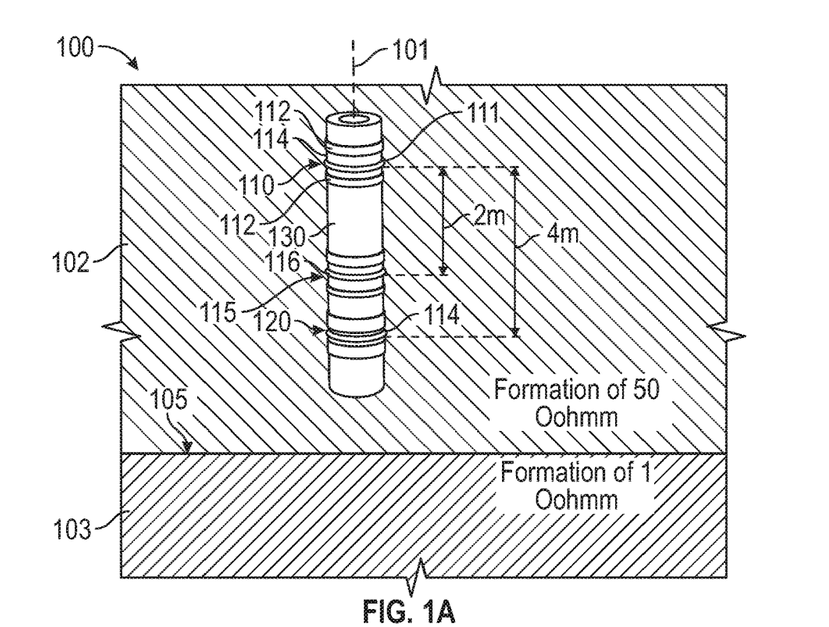
FIGS. 1A-1C illustrate tools for use in transient electromagnetic (TEM) logging according to embodiments of the present disclosure.
Figure 1B:
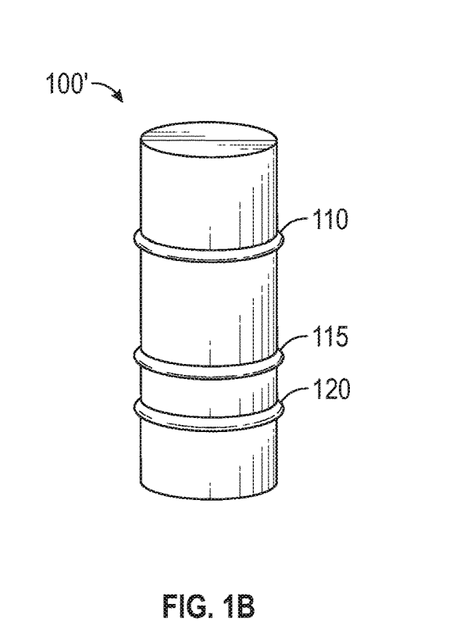
Figure 1C:
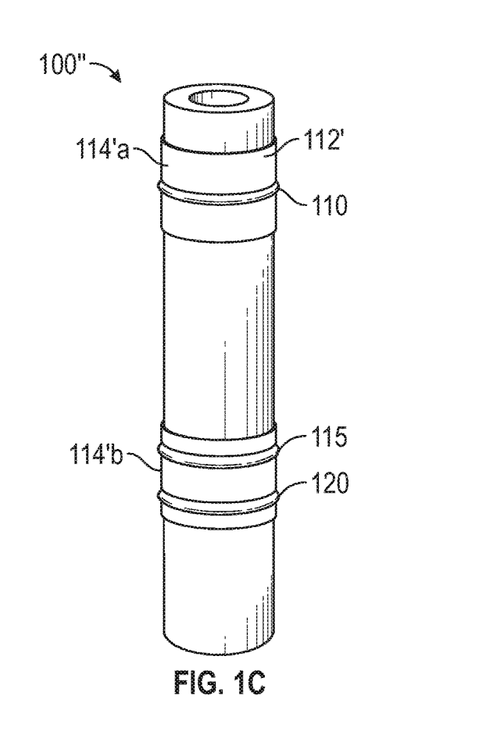

FIGS. 1A-1C illustrate tools for use in transient electromagnetic (TEM) logging according to embodiments of the present disclosure. Referring to FIG. 1A, tool 100 includes a conductive tubular 130. The tool may include transmitters 110 and 115 and receivers 120 disposed along tubular 130. Transmitter 110 may include an induction antenna, such as transmitter coil 111. Transmitter 115 may include an induction antenna, such as transmitter coil 116. Receiver 120 may include an induction antenna, such as transmitter coil 121. Other embodiments may include additional transmitters or receivers.

The transmitters 110 and 115 may be configured to induce a time-dependent current in the formation. For example, the antenna coils 111, 116 may be coupled with a current source by measurement circuitry to produce a time-varying current in the antenna coils 111, 116. The receiver 120 may be configured to convert a time-dependent transient electromagnetic signal induced by the formation responsive to the current into an output signal. The tool 100 may be configured to cause the transient electromagnetic signal by abruptly changing a magnetic moment of the transmitters 110 and 115. This may be carried out by switching a current on and off in the transmitter coils to generate pulses. The transmitters 110 and 115 each may include an antenna coil coupled with a current source and a magnetic core having residual magnetization.

Alternatively, the antenna coils 111, 116 may be electrically connected in circuit, including, for example, being formed from a single wire coupled with the current source. The moments of each transmitting loop (coil 111, coil 116) may be configured by using a particular number of turns, which may be different for each loop. In such a configuration, the current used would be the same for each wire, which provides reliable control over the relative moments of the transmitter loops.

Switching current in the antenna coil results in magnetization reversal in the magnetic core and change in magnetic dipole moment of the antenna. Some embodiments may use a particular antenna for both transmitting and receiving signals and/or as bucking coils or other bucking components.

The drill collar is further provided with a plurality of localized, conductive electromagnetic shielding regions 112, each region 112 being centered around either of the transmitter coils 111, 116 or the receiver coil 121. In the disclosed embodiment, the electromagnetic shielding regions 112 are created by covering a plurality of surfaces of the tubular with highly conductive copper coating. The plurality of surfaces may overlap the first and the second of the plurality of transmitters and the receiver. Coated regions 112 may reduce the effects of direct coupling between transmitter coils 111, 116 and receiver coil 121. In accordance with one aspect of the invention, regions 112 are short, i.e., less than one meter; in some embodiments, regions 112 are 0.75 m in length.

In other implementations, a single, unitary shielded region may be employed, which encompasses the plurality of transmitters (e.g., including all of the transmitters), the receiver coil, or combinations of transmitters and receivers, including a single, unitary shielded region extending along the longitudinal axis 101 of the tool across all the antennas of the tool.

The drill collar is further provided with a plurality of localized non-conductive magnetostatic shielding regions 114, similarly centered on either of the transmitter coils 111, 116 or the receiver coil 120. These magnetostatic shielding regions 114 may comprise, for example, a non-conductive ferrite coating or insert. The magnetostatic shielding regions 114 may reduce the effects of eddy currents induced in conductive tubular 130. In the presently disclosed embodiment, each region 114 is approximately 0.1 meters in axial length, centered on the respective coils.

Magnetostatic shielding 114 may be defined as a soft magnetic material of high (~1000 H·m$^{-1}$) permeability, such as, for example, ferrite. The magnetostatic shielding may reduce the intensity of the eddy currents in the pipe and, as a result, diminish the parasitic effect from the pipe. The shielding may be several meters in length.

In other implementations, a single, unitary shielded region may be employed, which encompasses the plurality of transmitters (e.g., including all of the transmitters), the receiver coil, or combinations of transmitters and receivers, including a single, unitary shielded region extending along the longitudinal axis 101 of the tool across all the antennas of the tool.

Returning to FIG. 1B, tool 100' includes a tubular 130' without shielding. Referring to FIG. 1C, tool 100" includes a conductive tubular 130 covered with single, unitary electromagnetically shielded region 112. The tubular is provided with a localized magnetostatic shielding 114a' for transmitter 110, while transmitter 115 and receiver 120 share magnetostatic shielding 114b'. Other embodiments may include a plurality of inserts with transmitters or receivers disposed on them—either sharing an insert, or alternatively, each antenna having a corresponding insert. Further implementations may use a set of coatings and/or inserts axially surrounding transmitters 110 and 115 and receiver 120, alone or collectively.

Many variations in transmitter and receiver configurations may be successfully employed. Transmitters and receivers may vary in number, location (e.g., with respect to the tool, to one another, to the drill bit, and so on) and orientation (e.g., transverse, longitudinal, tilted, etc.).

In operation, tool 100 is configured to effect changes in the transmitters to induce a time-dependent current in the formation. Transient signals occur in the receiver antennas that are induced by the formation responsive to the current. The induced signal contains information about formation characteristics. Thus, the receiver produces a response indicative of formation characteristics, such as the parameter of interest. A processor is configured to measure the time-dependent transient electromagnetic (TEM) signal induced by the formation.

As modeled, TEM tool 100 lies next to a formation interface 105. Transmitters 110 and 115 and receiver 120 lie along a common axis 101 that is horizontally positioned in the upper half-space 102 perpendicular to the interface and is separated by a distance from the interface. In this example, the transmitter-receiver spacing is 2 and 4 meters, respectively. The term "interface" includes a fluid interface between two different fluids in an earth formation (e.g., a fluid front) as well as a boundary between two different geologic or stratigraphic intervals in the earth (e.g., distance to bed). Examples following use distance to bed for convenience of illustration, but it should be readily apparent that embodiments wherein distance to an interface of a different type is estimated are within the scope of the disclosure. The upper half-space 102 has a resistivity of 50 Ω-m and the remote formation (lower half-space) 103 is shown to have a resistivity of 1 Ω-m. It should be noted that the coaxial transmitter-receiver configuration shown herein is not to be construed as a limitation and any suitable arrangement including but not limited to an arrangement having a transverse transmitter and/or a transverse receiver may be used.

We present numerical modeling results for the transient system standing alone. The parameters of the model used in the modeling were the following:

Pipe radius=7 cm
Pipe thickness=3 cm
Resistivity of drill=0.714 E-06 ohm-m
Resistivity of copper=1.4 E-08 ohm-m
Copper length under each coil=0.75 m
Ferrite magnetic permeability=100
Ferrite length under each coil=0.10 m
Ferrite thickness=1.5 cm
Transmitter/Receiver coils radius=8.5 cm.

Figure 2:
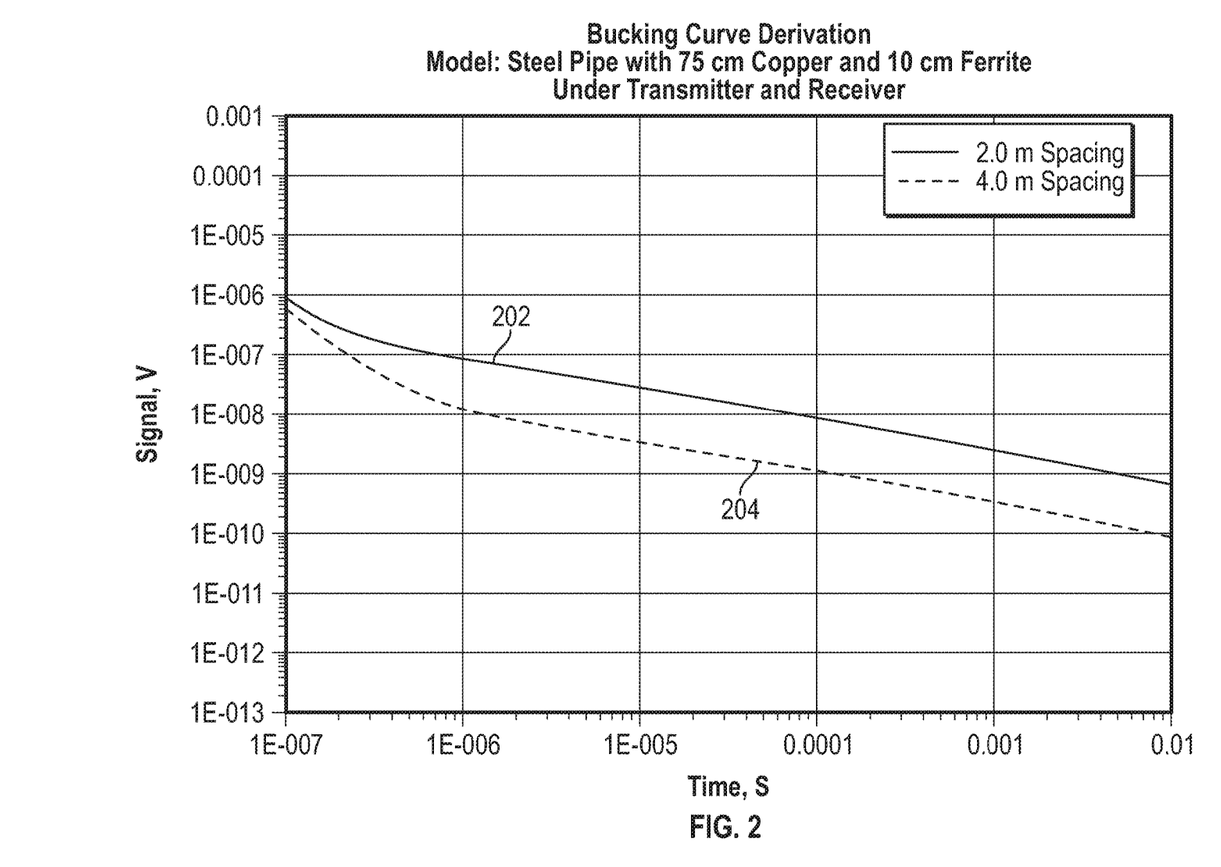
FIG. 2 illustrates modeled responses of a coaxial (ZZ) tool having in accordance with aspects of the present disclosure when signals are sequentially excited by each transmitting coil.

FIG. 2 illustrates modeled responses of a coaxial (ZZ) tool having in accordance with aspects of the present disclosure when signals are sequentially excited by each transmitting coil (without bucking), which shows signal from the pipe in the presence of short shields. The transmitting coils are separated by 2 m and receiving coil is placed at the distance of 2 m from the closest transmitter. The transient signal is due to the tool (e.g., conductive tubular and shields) only, since there is no formation in the model.

Responses are measured (in Volts) as the ordinate and the time is shown (in seconds) as the abscissa. It is readily apparent the response 202 attributable to the transmitter at 2 meters spacing from the receiver is larger than the response 204 attributable to the transmitter at 4 meters from the receiver.

Figure 3:
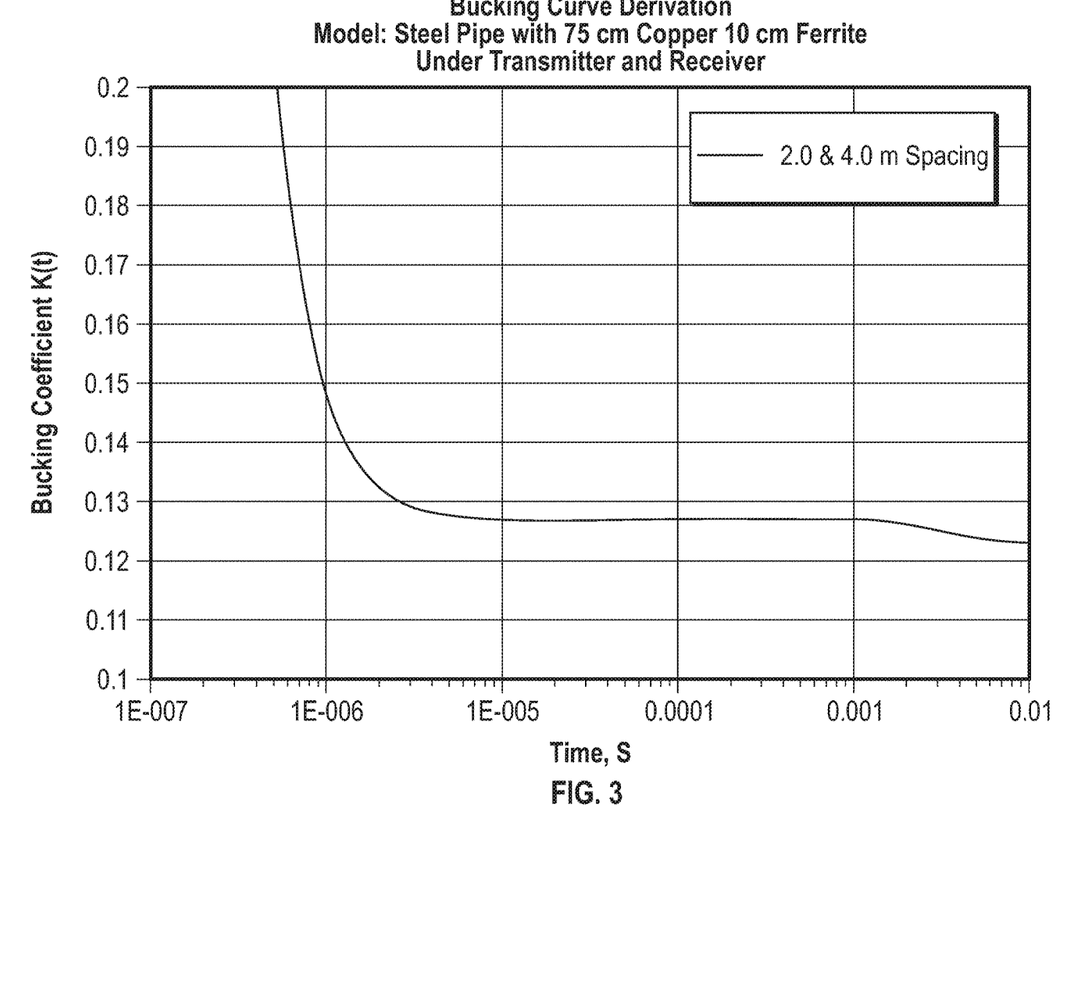
FIG. 3 illustrates a time dependent bucking coefficient used to perform bucking in accordance with embodiments of the present disclosure.

FIG. 3 illustrates a time dependent bucking coefficient used to perform bucking in accordance with embodiments of the present disclosure. The bucking coefficient is derived as a function of signals attributable (e.g., excited by) transmitter T1 and T2, respectively.

We further present numerical modeling results in the case of the transient system placed in a vertical well in two-layered formation for tubular 130 in tool 100 above. The tool is placed in the resistive upper half-space of 50 ohm-m having boundary with 1 ohm-m half-space placed at the distance of 4-16 meters below the drill bit. The parameters of the model are the same as those used above.

Figure 4:
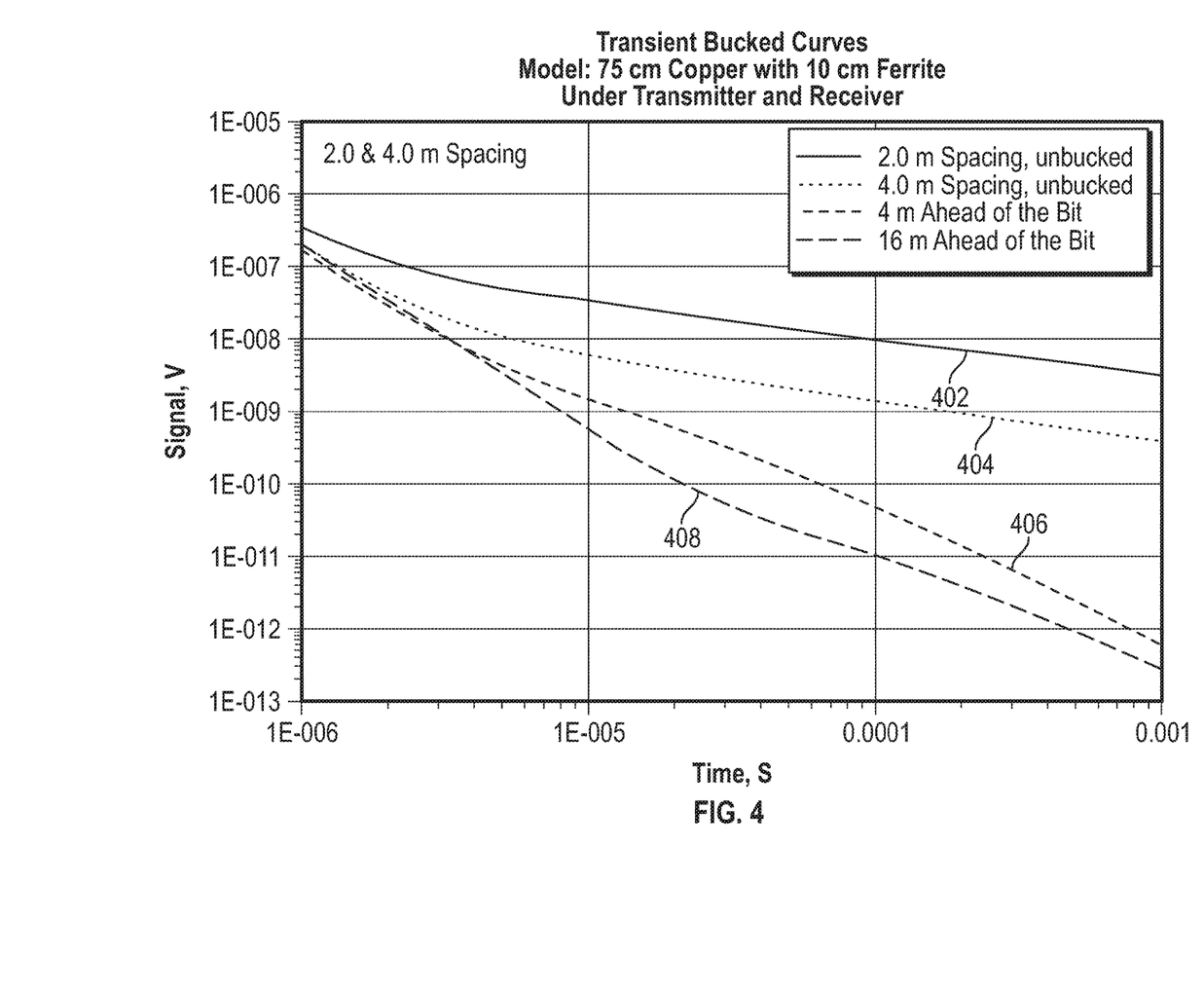
FIG. 4 illustrates bucked and unbucked responses of a coaxial (ZZ) tool in accordance with aspects of the present disclosure at various distances to the boundary.

FIG. 4 illustrates bucked and unbucked responses of a coaxial (ZZ) tool (as in FIG. 1) in accordance with aspects of the present disclosure at various distances to the boundary. For the bucked responses, the signal from the drill pipe is additionally suppressed by combining responses at the receiver attributable to the 2-meter and 4-meter transmitter signals using a bucking coefficient K derived from previous signals. The unbucked response 402 attributable to the transmitter at 2 meters spacing from the receiver is larger than the response 404 attributable to the transmitter at 4 meters from the receiver. The bucked response 406 corresponding to the 1 ohm-m half-space placed at the distance of 4 meters below the drill bit and the bucked response 408 corresponding to the 1 ohm-m half-space placed at the distance of 16 meters below the drill bit are also distinct.

Figure 5:
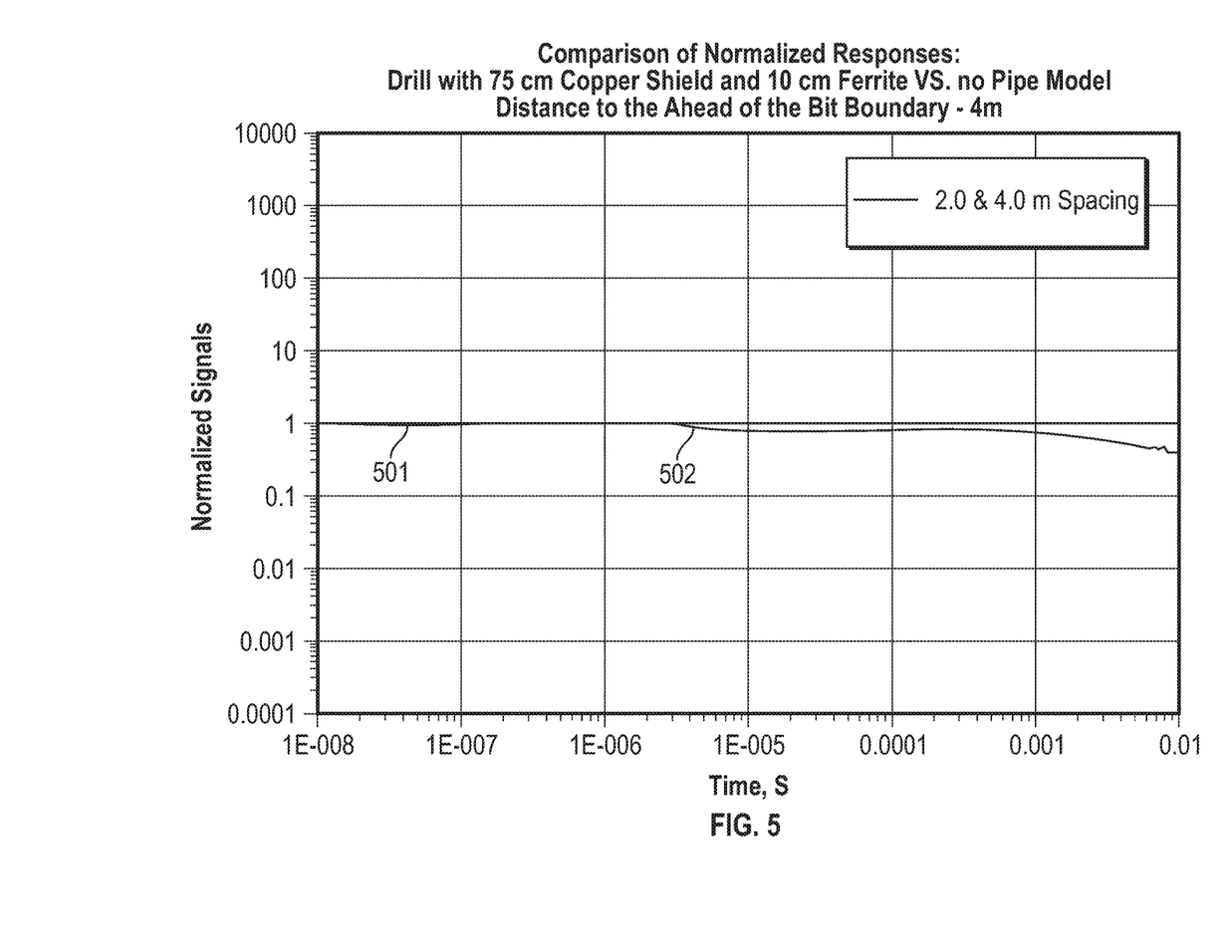
FIG. 5 illustrates bucked responses of a coaxial (ZZ) tool having a conductive tubular and electromagnetic and magnetostatic shielding in accordance with aspects of the present disclosure normalized by the corresponding transmitter/receiver moments.

FIG. 5 illustrates bucked responses of a coaxial (ZZ) tool having a conductive tubular (as in FIG. 1A) and electromagnetic and magnetostatic shielding in accordance with aspects of the present disclosure normalized by the corresponding transmitter/receiver moments. Here the signal from the pipe is additionally suppressed by combining responses at the 2-meter and 4-meter receiver signals using a bucking coefficient K derived from previous signals. Curve 501 shows the response when a conductive drill pipe with overlapping 75 cm copper shield and 10 cm ferrite shield present, while curve 502 shows the response if no drillpipe is present. As can be seen from FIG. 5, the two normalized signals coincide for most of the time interval of interest. This suggests that the bucked signal for the model with the drill pipe has the same shape as the signal in the absence of drillpipe, and 1D responses (models with no drill collar) can be used for interpretation of the 2D (or 3D) responses (models with pipe and inserts)—an important practical fact, since modeling of 1D response is much simpler to perform compared to modeling of 2D/3D response. For example, an inversion of the formation model exclusive of the tubular can be used, which greatly simplifies forward modeling. In contrast, in the case of a steel drill collar, there tends to be an interaction between eddy currents in the pipe and the formation. This interaction makes inversion more difficult and costly to perform.

Figure 6:
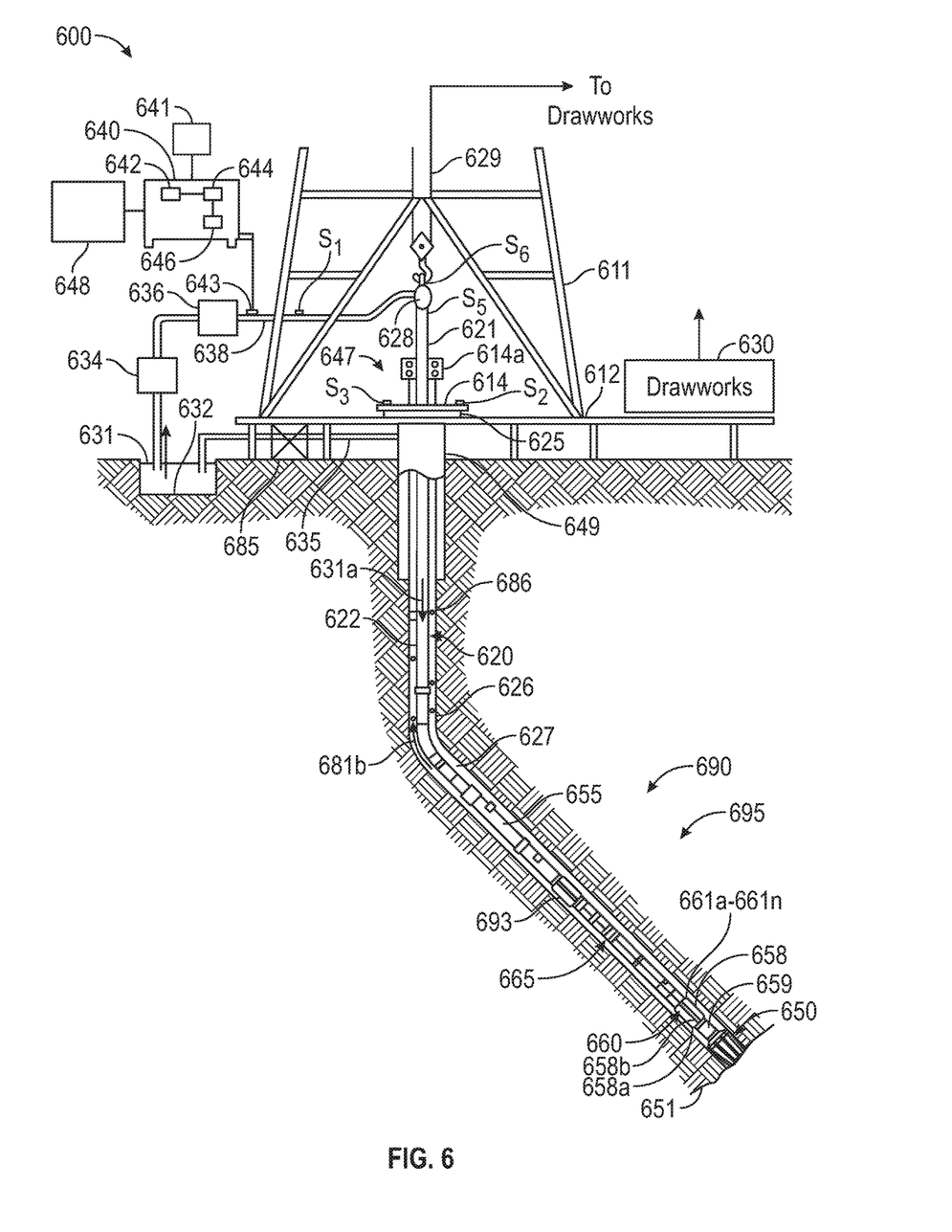
FIG. 6 is a schematic diagram of an example drilling system 10 in accordance with embodiments of the disclosure.

FIG. 6 is a schematic diagram of an example drilling system 10 in accordance with embodiments of the disclosure. FIG. 6 shows a drill string 620 that includes a bottomhole assembly (BHA) 690 conveyed in a borehole 626. The drilling system 10 includes a conventional derrick 611 erected on a platform or floor 612 which supports a rotary table 614 that is rotated by a prime mover, such as an electric motor (not shown), at a desired rotational speed. A tubing (such as jointed drill pipe 622), having the drilling assembly 690, attached at its bottom end extends from the surface to the bottom 651 of the borehole 626. A drill bit 650, attached to drilling assembly 690, disintegrates the geological formations when it is rotated to drill the borehole 626. The drill string 620 is coupled to a drawworks 630 via a Kelly joint 621, swivel 628 and line 629 through a pulley. Drawworks 630 is operated to control the weight on bit ("WOB"). The drill string 620 may be rotated by a top drive (not shown) instead of by the prime mover and the rotary table 614. Alternatively, a coiled-tubing may be used as the tubing 622. A tubing injector 614a may be used to convey the coiled-tubing having the drilling assembly attached to its bottom end. The operations of the drawworks 630 and the tubing injector 614a are known in the art and are thus not described in detail herein.

A suitable drilling fluid 631 (also referred to as the "mud") from a source 632 thereof, such as a mud pit, is circulated under pressure through the drill string 620 by a mud pump 634. The drilling fluid 631 passes from the mud pump 634 into the drill string 620 via a desurger 636 and the fluid line 638. The drilling fluid 631a from the drilling tubular discharges at the borehole bottom 651 through openings in the drill bit 650. The returning drilling fluid 631b circulates uphole through the annular space 627 between the drill string 620 and the borehole 626 and returns to the mud pit 632 via a return line 635 and drill cutting screen 685 that removes the drill cuttings 686 from the returning drilling fluid 631b. A sensor S1 in line 638 provides information about the fluid flow rate. A surface torque sensor S2 and a sensor S3 associated with the drill string 620 respectively provide information about the torque and the rotational speed of the drill string 620. Tubing injection speed is determined from the sensor S5, while the sensor S6 provides the hook load of the drill string 620.

Well control system 647 is placed at the top end of the borehole 626. The well control system 647 includes a surface blow-out-preventer (BOP) stack 615 and a surface choke 649 in communication with a wellbore annulus 627. The surface choke 649 can control the flow of fluid out of the borehole 626 to provide a back pressure as needed to control the well.

In some applications, the drill bit 650 is rotated by only rotating the drill pipe 622. However, in many other applications, a downhole motor 655 (mud motor) disposed in the BHA 690 also rotates the drill bit 650. The rate of penetration (ROP) for a given BHA largely depends on the WOB or the thrust force on the drill bit 650 and its rotational speed.

A surface control unit or controller 640 receives signals from the downhole sensors and devices via a sensor 643 placed in the fluid line 638 and signals from sensors S1-S6 and other sensors used in the system 10 and processes such signals according to programmed instructions provided to the surface control unit 660. The surface control unit 640 displays desired drilling parameters and other information on a display/monitor 641 that is utilized by an operator to control the drilling operations. The surface control unit 640 may be a computer-based unit that may include a processor 642 (such as a microprocessor), a storage device 644, such as a solid-state memory, tape or hard disc, and one or more computer programs 646 in the storage device 644 that are accessible to the processor 642 for executing instructions contained in such programs. The surface control unit 640 may further communicate with a remote control unit 648. The surface control unit 640 may process data relating to the drilling operations, data from the sensors and devices on the surface, and data received from downhole; and may control one or more operations of the downhole and surface devices. The data may be transmitted in analog or digital form.

The BHA 690 may include a tool 600 configured for performing transient electromagnetic (TEM) measurements. The BHA 690 may also contain other formation evaluation sensors or devices (also referred to as measurement-while-drilling ("MWD") or logging-while-drilling ("LWD") sensors) determining resistivity, density, porosity, permeability, acoustic properties, nuclear-magnetic resonance properties, formation pressures, properties or characteristics of the fluids downhole and other desired properties of the formation 695 surrounding the BHA 690. For convenience, all such sensors are generally denoted herein by numeral 665. The BHA 690 may further include a variety of other sensors and devices 659 for determining one or more properties of the BHA 690, such as vibration, bending moment, acceleration, oscillations, whirl, stick-slip, weight-on-bit, fluid flow rate, pressure, temperature, rate of penetration, azimuth, tool face, drill bit rotation, etc.

The BHA 690 may include a steering apparatus or tool 658 for steering the drill bit 650 along a desired drilling path. In one aspect, the steering apparatus may include a steering unit 660, having a number of force application members 661a-661n. The force application members may be mounted directly on the drill string, or they may be at least partially integrated into the drilling motor. In another aspect, the force application members may be mounted on a sleeve, which is rotatable about the center axis of the drill string. The force application members may be activated using electro-mechanical, electro-hydraulic or mud-hydraulic actuators. In yet another embodiment the steering apparatus may include a steering unit 658 having a bent sub and a first steering device 658a to orient the bent sub in the wellbore and the second steering device 658b to maintain the bent sub along a selected drilling direction. The steering unit 658, 660 may include near-bit inclinometers and magnetometers.

The drilling system 10 may include sensors, circuitry and processing software and algorithms for providing information about desired drilling parameters relating to the BHA, drill string, the drill bit and downhole equipment such as a drilling motor, steering unit, thrusters, etc. Many current drilling systems, especially for drilling highly deviated and horizontal wellbores, utilize coiled-tubing for conveying the drilling assembly downhole. In such applications a thruster may be deployed in the drill string 620 to provide the required force on the drill bit.

Exemplary sensors for determining drilling parameters include, but are not limited to drill bit sensors, an RPM sensor, a weight on bit sensor, sensors for measuring mud motor parameters (e.g., mud motor stator temperature, differential pressure across a mud motor, and fluid flow rate through a mud motor), and sensors for measuring acceleration, vibration, whirl, radial displacement, stick-slip, torque, shock, vibration, strain, stress, bending moment, bit bounce, axial thrust, friction, backward rotation, BHA buckling, and radial thrust. Sensors distributed along the drill string can measure physical quantities such as drill string acceleration and strain, internal pressures in the drill string bore, external pressure in the annulus, vibration, temperature, electrical and magnetic field intensities inside the drill string, bore of the drill string, etc. Suitable systems for making dynamic downhole measurements include COPILOT, a downhole measurement system, manufactured by BAKER HUGHES INCORPORATED.

The drilling system 10 can include one or more downhole processors at a suitable location such as 693 on the BHA 690. The processor(s) can be a microprocessor that uses a computer program implemented on a suitable non-transitory computer-readable medium that enables the processor to perform the control and processing. The non-transitory computer-readable medium may include one or more ROMs, EPROMs, EAROMs, EEPROMs, Flash Memories, RAMs, Hard Drives and/or Optical disks. Other equipment such as power and data buses, power supplies, and the like will be apparent to one skilled in the art. In one embodiment, the MWD system utilizes mud pulse telemetry to communicate data from a downhole location to the surface while drilling operations take place. The surface processor 642 can process the surface measured data, along with the data transmitted from the downhole processor, to evaluate the formation. While a drill string 620 is shown as a conveyance device for tool 600, it should be understood that embodiments of the present disclosure may be used in connection with tools conveyed via rigid (e.g. jointed tubular or coiled tubing) as well as non-rigid (e. g. wireline, slickline, e-line, etc.) conveyance systems. The drilling system 10 may include a bottomhole assembly and/or sensors and equipment for implementation of embodiments of the present disclosure on either a drill string or a wireline.

A point of novelty of the system illustrated in FIG. 6 is that the surface processor 642 and/or the downhole processor 693 are configured to perform certain methods (discussed below) that are not in the prior art. Surface processor 642 or downhole processor 693 may be configured to control steering apparatus 658, mud pump 634, drawworks 630, rotary table 614, downhole motor 655, other components of the BHA 690, or other components of the drilling system 10. Surface processor 642 or downhole processor 693 may be configured to control sensors described above and to estimate a property of the earth formation according to methods described herein.

Control of these components may be carried out using one or more models using methods described below. For example, surface processor 642 or downhole processor 693 may be configured to modify drilling operations i) autonomously upon triggering conditions, ii) in response to operator commands, or iii) combinations of these. Such modifications may include changing drilling parameters, steering the drillbit (e.g., geosteering), and so on. Control of these devices, and of the various processes of the drilling system generally, may be carried out in a completely automated fashion or through interaction with personnel via notifications, graphical representations, user interfaces and the like. Reference information accessible to the processor may also be used. In some general embodiments, surface processor 642, downhole processor 693, or other processors (e.g., remote processors) may be configured to operate the TEM tool 600 to induce and measure TEM signals.

Figure 7:
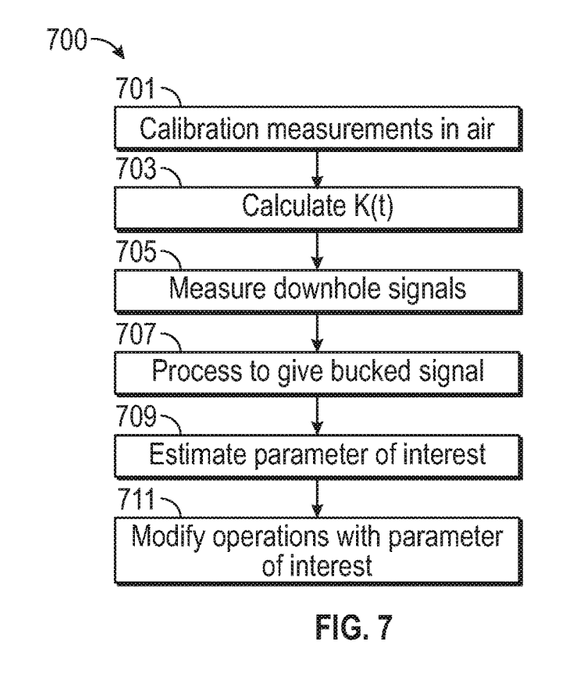
FIG. 7 illustrates a method for estimating a property of the earth formation in accordance with embodiments of the present disclosure.

FIG. 7 illustrates a method 700 for estimating a property of the earth formation in accordance with embodiments of the present disclosure. Transient calibration measurements are made 701 in a homogenous zone such as in air (i.e., with no formation around) and two signals $C_1(t)$ and $C_2(t)$, attributable to T1 and T2, respectively, are received in the receiver R1. At step 703, a time-dependent bucking coefficient may be estimated using a processor. For example, the bucking coefficient may be calculated as $$K(t) = C_2(t)/C_1(t) \tag{1}$$

using the processor. Alternatively, the coefficient may be estimated by minimizing the difference between $C_1(t)$ and $C_2(t)$ in a least square sense. For example, estimating $K(t)$ may be carried out by finding $$K(t) = k(t) \frac{M_1}{M_2} \frac{L_2^3}{L_1^3},$$

corresponding to $$\left| \sum_{i=1}^{N} \left( C_1(t_i) - k(t_i) \frac{M_1}{M_2} \frac{L_2^3}{L_1^3} C_2(t_i) \right)^2 \right|_{min}, \tag{2}$$

wherein $C_1$ is the first time-dependent TEM signal and $C_2$ is the second time-dependent TEM signal, $M_1$ is a magnetic moment of the first transmitter, $M_2$ is a magnetic moment of the second transmitter, $L_1^3$ is the distance from the first transmitter to the receiver and $L_2^3$ is the distance from the second transmitter to the receiver, and N is a number of measurement samples at corresponding discrete times $t_i$. As another alternative, the bucking coefficient can be estimated according to the formula:

$$K(t) = \frac{M_1}{M_2} \frac{L_2^3}{L_1^3}, \qquad (3)$$

wherein $M_1$ is a magnetic moment of the first transmitter, $M_2$ is a magnetic moment of the second transmitter, $L_1^3$ is the distance from the first transmitter to the receiver and $L_2^3$ is the distance from the second transmitter to the receiver.

Steps 701 and 703 comprise a bucking mode. At step 705, downhole transient measurements are made and two signals $S_1(t)$ and $S_2(t)$ are acquired, which correspond to transmitter T1 and T2. The measurements may be made sequentially, or the measurement corresponding to T1 may be taken during the measurement corresponding to T2 (e.g., simultaneously). Next, a processor is used to process the two signals $S_1(t)$ and $S_2(t)$ to estimate the differential (bucked) signal. This may be carried out at step 707 according to the equation $$\Delta S(t) = S_2(t) - K(t) \cdot S_1(t). \qquad (4)$$

Although, the first time-dependent TEM signal and the second time-dependent TEM signal include parasitic signal contributions from the tubular, the bucking coefficient K(t) is configured such that the bucked signal (e.g., $\Delta S(t)$) is substantially free of parasitic signal effects from the tubular.

Steps 705 and 707 constitute the main operational mode. Next, parameters of interest are estimated using the bucked signal at step 709. For example, an inversion of the differential (bucked) signal $\Delta S(t)$ may be done at step 709 giving a result that is substantially unaffected by the conductive pipe to find values of properties of the surrounding formation (e.g., resistivity properties). The property for which a value is estimated may include a formation resistivity, a formation conductivity, a formation dielectric constant, a distance to an interface such as water-oil contact, and/or a distance to an interface ahead of the drill formation. Optional step 711 may include using the property of the earth formation to conduct further operations in the earth formation. Step 711 may be carried out by modifying drilling operations in the borehole (e.g., geosteering) dependent upon one or more estimated values of the formation property (e.g., distance to interface).

Figure 8:
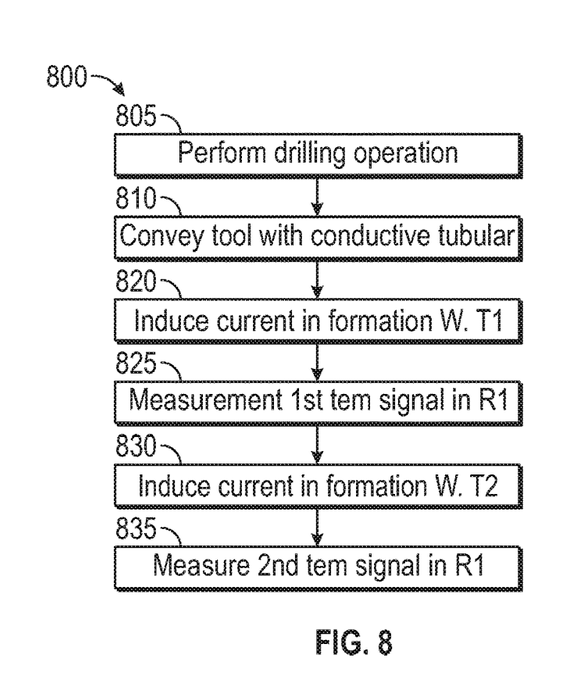
FIG. 8 illustrates a method for making a transient measurement in accordance with embodiments of the present disclosure.

FIG. 8 illustrates a method for making a transient measurement in accordance with embodiments of the present disclosure. Optional step 805 of the method 800 may include performing a drilling operation in a borehole. For example, a drill string may be used to form (e.g., drill) the borehole. Optional step 810 may include conveying a TEM tool 800 having a plurality of transmitters and a receiver on a conductive tubular in the borehole on a carrier. For example, a tool (e.g., tool 100) may be conveyed on the drill string.

Step 820 of the method 800 includes inducing a first current in the earth formation using a first transmitter of the plurality of transmitters. This may be carried out by abruptly changing a magnetic moment of the transmitter in the borehole. Step 825 of the method 800 includes measuring with the receiver a first time-dependent transient electromagnetic (TEM) signal induced by the formation responsive to the first current, which produces a first TEM measurement. The signal may be generated in the receiver (or indicative of the signal generated in the receiver) and caused by the formation responsive to the current.

Step 830 of the method 800 includes inducing a second current in the earth formation using a second transmitter of the plurality of transmitters. This may be carried out by abruptly changing a magnetic moment of the transmitter in the borehole. Step 835 of the method 800 includes measuring with the receiver a second time-dependent transient electromagnetic (TEM) signal induced by the formation responsive to the second current, which produces a second TEM measurement. The signal may be generated in the receiver (or indicative of the signal generated in the receiver) and caused by the formation responsive to the current.

Mathematical models, look-up tables, neural networks, or other models representing relationships between the signals and the values of the formation properties may be used to characterize the drilling operation, optimize one or more drilling parameters of a drilling operation, change direction of drilling, or otherwise modify drilling operations in the borehole. The system may carry out these actions through notifications, advice, and/or intelligent control.

The term "conveyance device" or "carrier" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, and self-propelled tractors. "Tubular," as used herein, means one or more segments of tubular, including, for example, drill pipe, drill collar, mandrel and so on.

The term "information" as used herein includes any form of information (analog, digital, EM, printed, etc.). As used herein, a processor is any information processing device that transmits, receives, manipulates, converts, calculates, modulates, transposes, carries, stores, or otherwise utilizes information. In several non-limiting aspects of the disclosure, a processor includes a computer that executes programmed instructions for performing various methods. These instructions may provide for equipment operation, control, data collection and analysis and other functions in addition to the functions described in this disclosure. The processor may execute instructions stored in computer memory accessible to the processor, or may employ logic implemented as field-programmable gate arrays ('FPGAs'), application-specific integrated circuits ('ASICs'), other combinatorial or sequential logic hardware, and so on.

Thus, configuration of the processor may include operative connection with resident memory and peripherals for executing programmed instructions. In some embodiments, estimation of the parameter of interest may involve applying a model. The model may include, but is not limited to, (i) a mathematical equation, (ii) an algorithm, (iii) a database of associated parameters, or a combination thereof.

As used above, a processor is any device that transmits, receives, manipulates, converts, calculates, modulates, transposes, carries, stores, or otherwise utilizes information. In several non-limiting aspects of the disclosure, an information processing device includes a computer that executes programmed instructions for performing various methods. Herein, the term "information" may include one or more of: raw data, processed data, and signals.

A short copper covering is defined herein as a covering of no greater than 1 meter in axial length, and a short ferrite covering is defined herein as a covering of no greater than 0.2 meters in axial length.

The conductive tubular as described above may be constructed from conductive materials or reduced conductivity materials. Conductive materials are defined as having a resistivity less than $10^{-5}$ ohm-meters (e.g., copper, silver, steel, etc.). Reduced conductivity materials may have a resistivity between $10^{-5}$ ohm-meters and $10^{-2}$ ohm-meters. Example reduced conductivity materials include composite materials, powdered metals, and so on. One specific type of composite materials includes carbon-reinforced composite materials. These materials have conductive carbon filaments embedded in their matrix material (e.g., resin), which makes them slightly conductive.

By "substantially free of parasitic signal effects" it is meant that the model with a pipe is within a tolerable deviation of the model without a pipe, wherein the deviation is sufficiently low to allow use of TEM signals generated in connection therewith to determine a value of a property of the formation ahead of the bit, examples of such deviation including, for example, less than 5 percent, less than 4 percent, less than 3 percent, less than 2 percent, less than 1 percent, and so on, down to and including zero difference.

By "substantially eliminated" it is meant that the dual transmitter system results in cross-talk sufficiently low to allow use of TEM signals generated in connection therewith to determine a value of a property of the formation ahead of the bit, including, for example, leaving the three most significant digits of the original signal unaltered, leaving the four most significant digits of the original signal unaltered, leaving the five most significant digits of the original signal unaltered, and so on, down to and including zero cross-talk.

The term "predominantly" relates to an amount of current induced in a depth of investigation in the earth formation relative to an amount of current induced in another depth in the earth formation. A predominantly greater amount of current induced in the depth of interest will provide a response of electromagnetic energy that can be related to a property of the earth formation at the depth of investigation. As used herein, the term "predominantly" relates at least to a minimum amount of increase in currents induced at the depth of investigation with respect to other depths, the minimum amount being necessary to be able to estimate a property of the earth formation at the depth of investigation from the response.

Estimated parameters of interest may be stored (recorded) as information or visually depicted on a display. Aspects of the present disclosure relate to modeling a volume of an earth formation using the estimated parameter of interest, such as, for example, by associating estimated parameter values with portions of the volume of interest to which they correspond. The model of the earth formation generated and maintained in aspects of the disclosure may be implemented as a representation of the earth formation stored as information. The information (e.g., data) may be stored on a non-transitory machine-readable medium, and rendered (e.g., visually depicted) on a display.

Control of components of apparatus and systems described herein may be carried out using one or more models as described above. For example, at least one processor may be configured to modify operations i) autonomously upon triggering conditions, ii) in response to operator commands, or iii) combinations of these. Such modifications may include changing drilling parameters, steering the drillbit (e.g., geosteering), changing a mud program, optimizing measurements, and so on. Control of these devices, and of the various processes of the drilling system generally, may be carried out in a completely automated fashion or through interaction with personnel via notifications, graphical representations, user interfaces and the like. Reference information accessible to the processor may also be used.

The processing of the measurements by a processor may occur at the tool, or at a remote location. The data acquisition may be controlled at least in part by the electronics. Implicit in the control and processing of the data is the use of a computer program on a suitable non-transitory machine readable medium that enables the processors to perform the control and processing. The non-transitory machine readable medium may include ROMs, EPROMs, EEPROMs, flash memories and optical disks. The term processor is intended to include devices such as a field programmable gate array (FPGA).

While the present disclosure is discussed in the context of a hydrocarbon producing well, it should be understood that the present disclosure may be used in any borehole environment (e.g., a water or geothermal well).

The present disclosure is susceptible to embodiments of different forms. There are shown in the drawings, and herein are described in detail, specific embodiments of the present disclosure with the understanding that the present disclosure is to be considered an exemplification of the principles of the disclosure and is not intended to limit the disclosure to that illustrated and described herein. While the foregoing disclosure is directed to the one mode embodiments of the disclosure, various modifications will be apparent to those skilled in the art. It is intended that all variations be embraced by the foregoing disclosure.

I claim:

1. A method for evaluating an earth formation intersected by a borehole, the method comprising:
conveying a carrier in a borehole, the carrier including a conducting tubular having a plurality of transmitters and a receiver non-collocated with the plurality of transmitters;
inducing a first current in the earth formation using a first transmitter of the plurality of transmitters;
measuring with the receiver a first time-dependent transient electromagnetic (TEM) signal induced by the formation responsive to the first current;
inducing a second current in the earth formation using a second transmitter of the plurality of transmitters;
measuring with the receiver a second TEM signal induced by the formation responsive to the second current; and
using at least one processor to estimate a value of a resistivity property of the earth formation using a bucked signal derived from the first time-dependent TEM signal, the second time-dependent TEM signal, and a bucking coefficient K(t).

2. The method of claim 1 wherein the first time-dependent TEM signal and the second time-dependent TEM signal include parasitic signal contributions from the tubular, and the bucking coefficient K(t) is configured such that the bucked signal is substantially free of parasitic signal effects from the tubular.

3. The method of claim 1 comprising estimating the bucking coefficient K(t) using signals received at the receiver in response to transmission of a corresponding electromagnetic pulse from each of the first transmitter and the second transmitter while the carrier is outside of the earth formation.

4. method of claim 3 comprising estimating the bucking coefficient K(t) by at least one of:
i) estimating the bucking coefficient according to $$K(t) = C_2(t)/C_1(t),$$

wherein $C_1$ is the first time-dependent TEM signal and $C_2$ is the second time-dependent TEM signal;

ii) estimating the bucking coefficient according to $$K(t) = \frac{M_1}{M_2}\frac{L_2^3}{L_1^3},$$

wherein $M_1$ is a magnetic moment of the first transmitter, $M_2$ is a magnetic moment of the second transmitter, $L_1$ is the distance from the first transmitter to the receiver and $L_2$ is the distance from the second transmitter to the receiver; and iii) finding $$K(t) = k(t)\frac{M_1}{M_2}\frac{L_2^3}{L_1^3}$$

corresponding to $$\left|\sum_{i=1}^{N}\left(C_1(t) - k(t)\frac{M_1}{M_2}\frac{L_2^3}{L_1^3}C_2(t)\right)^2\right|_{min},$$

wherein $C_1$ is the first time-dependent TEM signal and $C_2$ is the second time-dependent TEM signal, $M_1$ is a magnetic moment of the first transmitter, $M_2$ is a magnetic moment of the second transmitter, $L_1^3$ is the distance from the first transmitter to the receiver and $L_2^3$ is the distance from the second transmitter to the receiver, and N is a number of measurement samples at corresponding discrete times.

5. The method of claim 1 comprising covering a plurality of surfaces of the tubular with electromagnetic shielding, wherein the plurality of surfaces overlap the first and the second of the plurality of transmitters and the receiver.

6. The method of claim 5 comprising covering a plurality of surfaces of the electromagnetic shielding with magnetostatic shielding.

7. The apparatus of claim 6 wherein the magnetostatic shielding comprises a soft magnetic material.

8. The method of claim 7 comprising deriving the bucked signal, wherein the bucked signal is substantially unaffected by a parasitic signal from the conducting tubular.

9. The method of claim 1 comprising using the resistivity property of the earth formation to conduct further operations in the earth formation.

10. The method of claim 1 wherein the resistivity property of the earth formation is selected from: (i) a resistivity of the formation, (ii) a conductivity of the formation, and (iii) a dielectric constant of the formation.

11. The method of claim 1 wherein the carrier further comprises a bottomhole assembly including a drill bit, and the resistivity property of the earth formation comprises a distance to an interface in the earth formation, the method further comprising controlling a direction of drilling of the bottomhole assembly using the estimated value of the distance to the interface.

12. The method of claim 11 comprising estimating the resistivity property for a portion of the earth formation ahead of the drill bit.

13. The method of claim 1 wherein the first transmitter comprises a first antenna coil and the second transmitter comprises a second antenna coil electrically connected in circuit with the first antenna coil, and the first current is equal to the second current.

14. The method of claim 13 wherein the first antenna coil comprises a first number of turns of a wire and the second antenna coil comprises a second number of turns of the wire different than the first number of turns.

15. The method of claim 1 wherein the conductive tubular comprises at least one reduced conductivity composite material.

16. The method of claim 1 wherein the first current is equal to the second current.

17. A system for evaluating an earth formation intersected by a borehole, the system comprising:
a bottomhole assembly (BHA) configured for conveyance in a borehole, the BHA including:
  i) a drill bit configured to drill the borehole by disintegrating the earth formation during rotation, and
  ii) a conducting tubular having a plurality of transmitters and a receiver non-collocated with the plurality of transmitters;
wherein the BHA is configured to:
  induce a first current in the earth formation using a first transmitter of the plurality of transmitters;
  measure with the receiver a first time-dependent transient electromagnetic (TEM) signal induced by the formation responsive to the first current;
  induce a second current in the earth formation using a second transmitter of the plurality of transmitters;
  measure with the receiver a second TEM signal induced by the formation responsive to the second current; and
  estimate a value of a resistivity property of the earth formation with at least one processor using a bucked signal derived from the first time-dependent TEM signal and the second time-dependent TEM signal.

18. The system of claim 17 wherein the first transmitter comprises a first antenna coil and the second transmitter comprises a second antenna coil electrically connected in circuit with the first antenna coil, and the first current is equal to the second current.

* * * * *